(12) United States Patent
Cendrillon et al.

(10) Patent No.: US 8,843,130 B1
(45) Date of Patent: Sep. 23, 2014

(54) DIRECTIONAL OVERLOAD COORDINATION FOR CELLULAR TELEPHONE INTERCELL INTERFERENCE

(75) Inventors: Raphael Cendrillon, Kennedy Town (HK); Kyungho Kim, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 1722 days.

(21) Appl. No.: 12/198,527

(22) Filed: Aug. 26, 2008

Related U.S. Application Data

(60) Provisional application No. 60/969,026, filed on Aug. 30, 2007.

(51) Int. Cl.
   *H04W 4/00* (2009.01)
(52) U.S. Cl.
   USPC ........................................... 455/435.1
(58) Field of Classification Search
   CPC ..... H04W 60/00; H04W 16/14; H04W 48/16; H04W 48/18; H04W 16/28; H04W 16/148
   USPC ............... 455/435.1, 434, 446, 448, 562.1
   See application file for complete search history.

(56) References Cited

U.S. PATENT DOCUMENTS

| | | | |
|---|---|---|---|
| 5,241,686 A * | 8/1993 | Charbonnier | 455/453 |
| 6,985,739 B2 * | 1/2006 | Spaling et al. | 455/453 |
| 7,027,829 B1 * | 4/2006 | Laakso et al. | 455/522 |
| 7,162,203 B1 * | 1/2007 | Brunner | 455/63.1 |
| 7,162,250 B2 * | 1/2007 | Misra | 455/453 |
| 7,336,969 B2 * | 2/2008 | Minnick et al. | 455/521 |
| 7,542,722 B2 * | 6/2009 | Carlsson | 455/63.1 |
| 7,796,698 B2 * | 9/2010 | Koorapaty et al. | 375/260 |
| 7,817,996 B2 * | 10/2010 | Brunner | 455/422.1 |
| 7,822,413 B2 * | 10/2010 | Brunner | 455/422.1 |
| 7,920,537 B2 * | 4/2011 | Jones | 370/342 |
| 7,962,132 B2 * | 6/2011 | Brunner | 455/422.1 |
| 2006/0007889 A1 * | 1/2006 | Khan | 370/331 |
| 2006/0104253 A1 * | 5/2006 | Douglas et al. | 370/338 |
| 2006/0153075 A1 * | 7/2006 | Whitehill et al. | 370/230 |

OTHER PUBLICATIONS

IEEE Std 802.16-2004 (Revision of IEEE Std 802.16-2001); IEEE Standard for Local and metropolitan area networks; Part 16: Air Interface for Fixed Broadband Wireless Access Systems; IEEE Computer Society and the IEEE Microwave Theory and Techniques Society; Sponsored by the LAN/MAN Standards Committee; Oct. 1, 2004; 893 pages.

* cited by examiner

*Primary Examiner* — Brandon Miller

(57) ABSTRACT

Apparatus having corresponding methods and computer programs comprise: a plurality of antennas located in a first cellular telephone cell; an interference module to identify wireless cellular telephone signals received by the plurality of antennas from one or more cellular telephones located in one or more second cellular telephone cells; and a cell module to identify the one or more second cellular telephone cells based on the wireless cellular telephone signals received by the plurality of antennas from the one or more cellular telephones located in the one or more second cellular telephone cells.

12 Claims, 4 Drawing Sheets

DIRECTIONAL OVERLOAD COORDINATION FOR CELLULAR TELEPHONE INTERCELL INTERFERENCE

CROSS-REFERENCE TO RELATED APPLICATIONS

This application claims the benefit of U.S. Provisional Patent Application Ser. No. 60/969,026, filed on Aug. 30, 2007, the disclosure thereof incorporated by reference herein in its entirety.

BACKGROUND

The present disclosure relates generally to cellular telephone communications. More particularly, the present disclosure relates to overload coordination for cellular telephone intercell interference.

In the uplink of a cellular telephone system, cellular telephones within a cellular telephone cell transmit wireless cellular telephone signals to the base station serving the cell. However, the base station serving a cell receives wireless cellular telephone signals not only from cellular telephones within the cell, but also from cellular telephones in neighboring cells. The signals received from neighboring cells appear as interference, referred to as "intercell interference," which severely limits the coverage and throughput of a network. FIG. 1 shows an example of intercell interference.

Referring to FIG. 1, a cellular telephone 108 located in one cell 104B transmits wireless cellular telephone signals 106, which are received by the base station 102B serving that cell 104B. However, wireless cellular telephone signals 106 are also received by a base station 102A serving a neighboring cell 104A. Signals 106 constitute intercell interference for base station 102A.

One way to mitigate intercell interference is to force neighboring cells to use different sections of the frequency spectrum. Although this helps to alleviate intercell interference, another problem remains that cannot be addressed by simple frequency domain separation. When cellular telephones at the edge of a cell transmit wireless cellular telephone signals at high power, they can cause the signal level received at a base station in a neighboring cell to be extremely high. This can cause the analog front end of the neighboring base station to be overloaded, leading to degradation of signal quality and loss of service in the neighboring cell.

One way to mitigate this type of base station overload is to use an overload indicator. FIG. 2 shows an example of the conventional use of an overload indicator to mitigate intercell interference. Referring to FIG. 2, when base station 102A becomes overloaded, base station 102A transmits overload indicators 110B-G to all neighboring base stations, including base station 102B. In response, the neighboring base stations instruct the cellular telephones within their cells to reduce transmit power. For example, base station 102B transmits an instruction 112 to all cellular telephones 108 in cell 104B. In response to instruction 112, cellular telephones 108 reduce their transmit power, thereby reducing intercell interference received by base station 102A.

One disadvantage of the conventional overload indicator approach is that a base station does not determine which cell is responsible for causing the intercell interference, and so sends the overload indicator indiscriminately to all neighboring cells. Therefore, even cells that are not causing significant intercell interference are forced to reduce their transmit power unnecessarily, leading to a decrease in throughput in those cells while providing no benefit to the overloaded cell.

SUMMARY

In general, in one aspect, an embodiment features an apparatus comprising: a plurality of antennas located in a first cellular telephone cell; an interference module to identify wireless cellular telephone signals received by the plurality of antennas from one or more cellular telephones located in one or more second cellular telephone cells; and a cell module to identify the one or more second cellular telephone cells based on the wireless cellular telephone signals received by the plurality of antennas from the one or more cellular telephones located in the one or more second cellular telephone cells.

Embodiments of the apparatus can include one or more of the following features. Some embodiments comprise an overload indicator module to send an overload indicator only to base stations serving the one or more second cellular telephone cells. In some embodiments, the cell module comprises: a direction module to determine directions of the wireless cellular telephone signals received by the plurality of antennas from the one or more cellular telephones located in the one or more second cellular telephone cells based on a geometry of the plurality of antennas and relative phase delays of the wireless cellular telephone signals received by the plurality of antennas from the one or more cellular telephones located in the one or more second cellular telephone cells; wherein the cell module identifies the one or more second cellular telephone cells based on the directions of the wireless cellular telephone signals received by the plurality of antennas from the one or more cellular telephones located in the one or more second cellular telephone cells. In some embodiments, the interference module identifies the wireless cellular telephone signals received by the plurality of antennas from the one or more cellular telephones located in the one or more second cellular telephone cells based on wireless cellular telephone signals received by the plurality of antennas when no cellular telephones located in the first cellular telephone cell are transmitting. In some embodiments, the interference module identifies the wireless cellular telephone signals received by the plurality of antennas from the one or more cellular telephones located in the second cellular telephone cell based on a difference between all wireless cellular telephone signals received by the plurality of antennas and wireless cellular telephone signals received by the plurality of antennas from cellular telephones located in the first cellular telephone cell. In some embodiments, the wireless cellular telephone signals received by the plurality of antennas from the one or more cellular telephones located in the second cellular telephone cell comply with one or more of: the IEEE 802.16 standards; the 3GPP standards; and the 3GPP2 standards.

In general, in one aspect, an embodiment features a method comprising: identifying wireless cellular telephone signals received by a plurality of antennas located in a first cellular telephone cell from one or more cellular telephones located in one or more second cellular telephone cells; and identifying the one or more second cellular telephone cells based on the wireless cellular telephone signals received by the plurality of antennas from the one or more cellular telephones located in the one or more second cellular telephone cells.

Embodiments of the method can include one or more of the following features. Some embodiments comprise sending an overload indicator only to base stations serving the one or more second cellular telephone cells. Some embodiments comprise determining a direction of the wireless cellular telephone signals received by the plurality of antennas from the one or more cellular telephones located in the one or more second cellular telephone cells based on a geometry of the plurality of antennas and relative phase delays of the wireless cellular telephone signals received by the plurality of antennas from the one or more cellular telephones located in the one or more second cellular telephone cells; wherein the one or more second cellular telephone cells are identified based on directions of the wireless cellular telephone signals received by the plurality of antennas from the one or more cellular telephones located in the one or more second cellular telephone cells. In some embodiments, the wireless cellular telephone signals received by the plurality of antennas from the one or more cellular telephones located in the one or more second cellular telephone cells are identified based on wireless cellular telephone signals received by the plurality of antennas when no cellular telephones located in the first cellular telephone cell are transmitting. In some embodiments, the wireless cellular telephone signals received by the plurality of antennas from the one or more cellular telephones located in the one or more second cellular telephone cells are identified based on a difference between all wireless cellular telephone signals received by the plurality of antennas and wireless cellular telephone signals received by the plurality of antennas from cellular telephones located in the first cellular telephone cell. In some embodiments, the wireless cellular telephone signals received by the plurality of antennas from the one or more cellular telephones located in the one or more second cellular telephone cells comply with one or more of: the IEEE 802.16 standards; the 3GPP standards; and the 3GPP2 standards.

In general, in one aspect, an embodiment features a computer program comprising: instructions for identifying wireless cellular telephone signals received by a plurality of antennas located in a first cellular telephone cell from one or more cellular telephones located in one or more second cellular telephone cells; and instructions for identifying the one or more second cellular telephone cells based on the wireless cellular telephone signals received by the plurality of antennas from the one or more cellular telephones located in the one or more second cellular telephone cells.

Embodiments of the computer program can include one or more of the following features. Some embodiments comprise instructions for sending an overload indicator only to base stations serving the one or more second cellular telephone cells. Some embodiments comprise instructions for determining a direction of the wireless cellular telephone signals received by the plurality of antennas from the one or more cellular telephones located in the one or more second cellular telephone cells based on a geometry of the plurality of antennas and relative phase delays of the wireless cellular telephone signals received by the plurality of antennas from the one or more cellular telephones located in the one or more second cellular telephone cells; wherein the one or more second cellular telephone cells are identified based on directions of the wireless cellular telephone signals received by the plurality of antennas from the one or more cellular telephones located in the one or more second cellular telephone cells. In some embodiments, the wireless cellular telephone signals received by the plurality of antennas from the one or more cellular telephones located in the one or more second cellular telephone cells are identified based on wireless cellular telephone signals received by the plurality of antennas when no cellular telephones located in the first cellular telephone cell are transmitting. In some embodiments, the wireless cellular telephone signals received by the plurality of antennas from the one or more cellular telephones located in the one or more second cellular telephone cells are identified based on a difference between all wireless cellular telephone signals received by the plurality of antennas and wireless cellular telephone signals received by the plurality of antennas from cellular telephones located in the first cellular telephone cell. In some embodiments, the wireless cellular telephone signals received by the plurality of antennas from the one or more cellular telephones located in the one or more second cellular telephone cells comply with one or more of: the IEEE 802.16 standards; the 3GPP standards; and the 3GPP2 standards.

In general, in one aspect, an embodiment features an apparatus comprising: a plurality of antenna means for receiving wireless signals, wherein the plurality of antenna means is located in a first cellular telephone cell; interference means for identifying wireless cellular telephone signals received by the plurality of antenna means from one or more cellular telephones located in one or more second cellular telephone cells; and cell means for identifying the one or more second cellular telephone cells based on the wireless cellular telephone signals received by the plurality of antenna means from the one or more cellular telephones located in the one or more second cellular telephone cells.

Embodiments of the apparatus can include one or more of the following features. Some embodiments comprise overload indicator means for sending an overload indicator only to base stations serving the one or more second cellular telephone cells. In some embodiments, the cell means comprises: direction means for determining directions of the wireless cellular telephone signals received by the plurality of antenna means from the one or more cellular telephones located in the one or more second cellular telephone cells based on a geometry of the plurality of antenna means and relative phase delays of the wireless cellular telephone signals received by the plurality of antenna means from the one or more cellular telephones located in the one or more second cellular telephone cells; wherein the cell means identifies the one or more second cellular telephone cells based on the directions of the wireless cellular telephone signals received by the plurality of antenna means from the one or more cellular telephones located in the one or more second cellular telephone cells. In some embodiments, the interference means identifies the wireless cellular telephone signals received by the plurality of antenna means from the one or more cellular telephones located in the one or more second cellular telephone cells based on wireless cellular telephone signals received by the plurality of antenna means when no cellular telephones located in the first cellular telephone cell are transmitting. In some embodiments, the interference means identifies the wireless cellular telephone signals received by the plurality of antenna means from the one or more cellular telephones located in the second cellular telephone cell based on a difference between all wireless cellular telephone signals received by the plurality of antenna means and wireless cellular telephone signals received by the plurality of antenna means from cellular telephones located in the first cellular telephone cell. In some embodiments, the wireless cellular telephone signals received by the plurality of antenna means from the one or more cellular telephones located in the second cellular telephone cell comply with one or more of: the IEEE 802.16 standards; the 3GPP standards; and the 3GPP2 standards.

The details of one or more implementations are set forth in the accompanying drawings and the description below. Other features will be apparent from the description and drawings, and from the claims.

Figure 1:
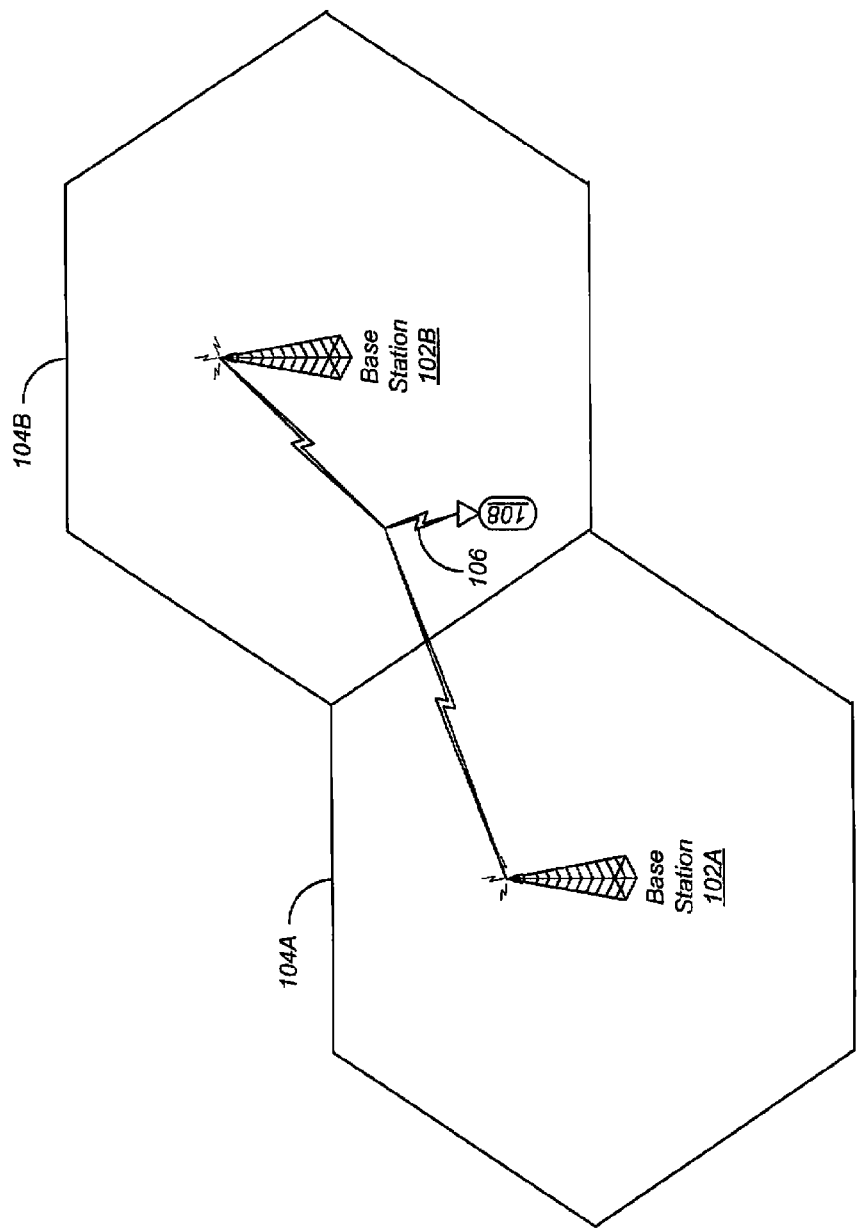
FIG. 1 shows an example of intercell interference.
Figure 2:
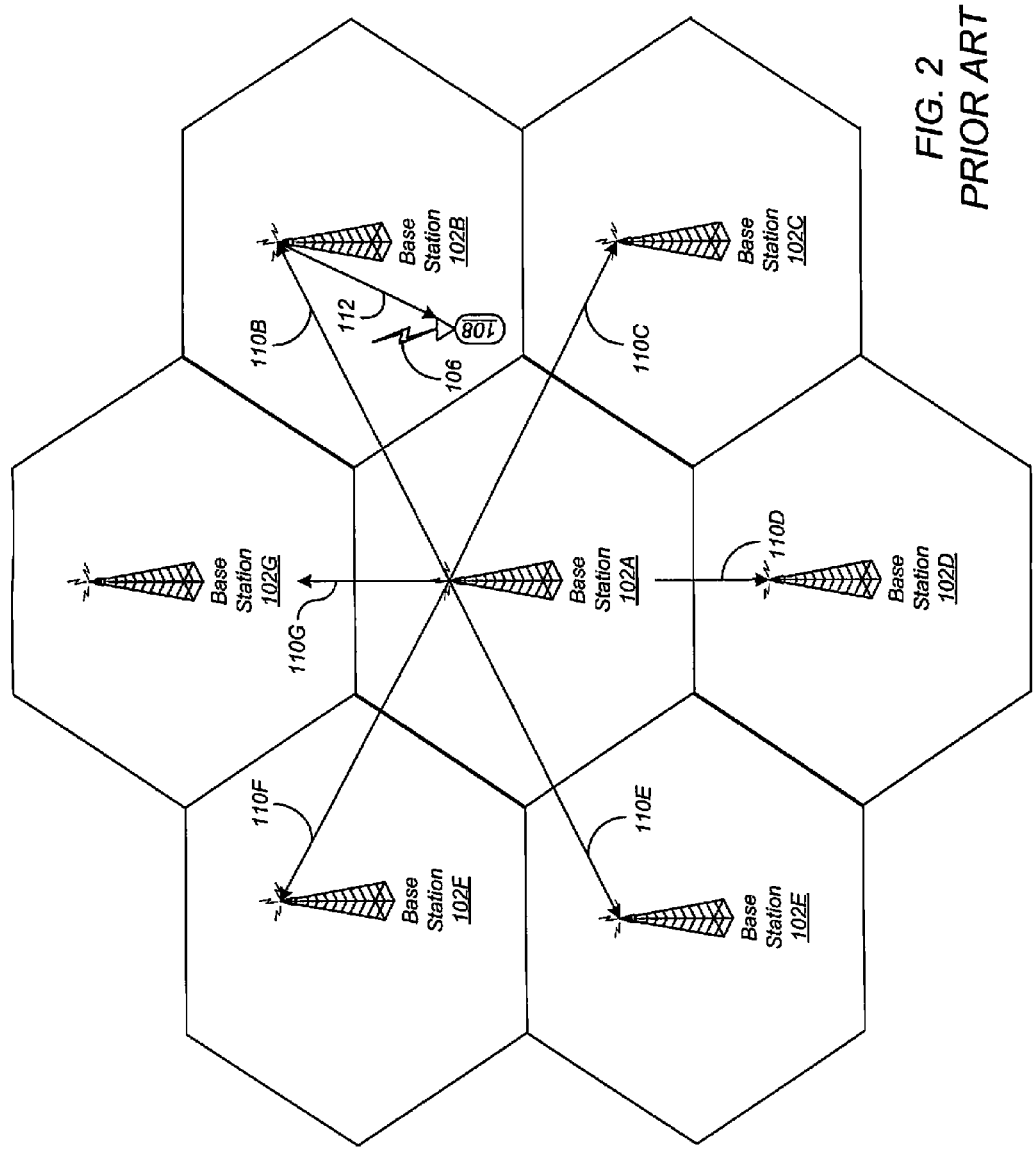
FIG. 2 shows an example of the conventional use of an overload indicator to mitigate intercell interference.

The leading digit(s) of each reference numeral used in this specification indicates the number of the drawing in which the reference numeral first appears.

DETAILED DESCRIPTION

Modern base stations employ multiple receive antennas to increase service reliability through the use of receive diversity, to increase throughput through the use of spatial multiplexing, and the like. Embodiments of the present invention employ these multiple receive antennas to determine the direction of intercell interference by, for example, measuring the spatial correlation of the interference across the antenna array at the base station. The cell(s) responsible for the intercell interference are identified based on the direction of the intercell interference. In one embodiment, an overload indicator is sent only to the identified cell(s). By targeting the overload indicator only to the base station(s) responsible for the intercell interference, the unnecessary reduction of cellular telephone transmit power in cells not responsible for intercell interference is avoided. One benefit of this approach compared to the conventional approach is a relative increase in overall network throughput.

Figure 3:
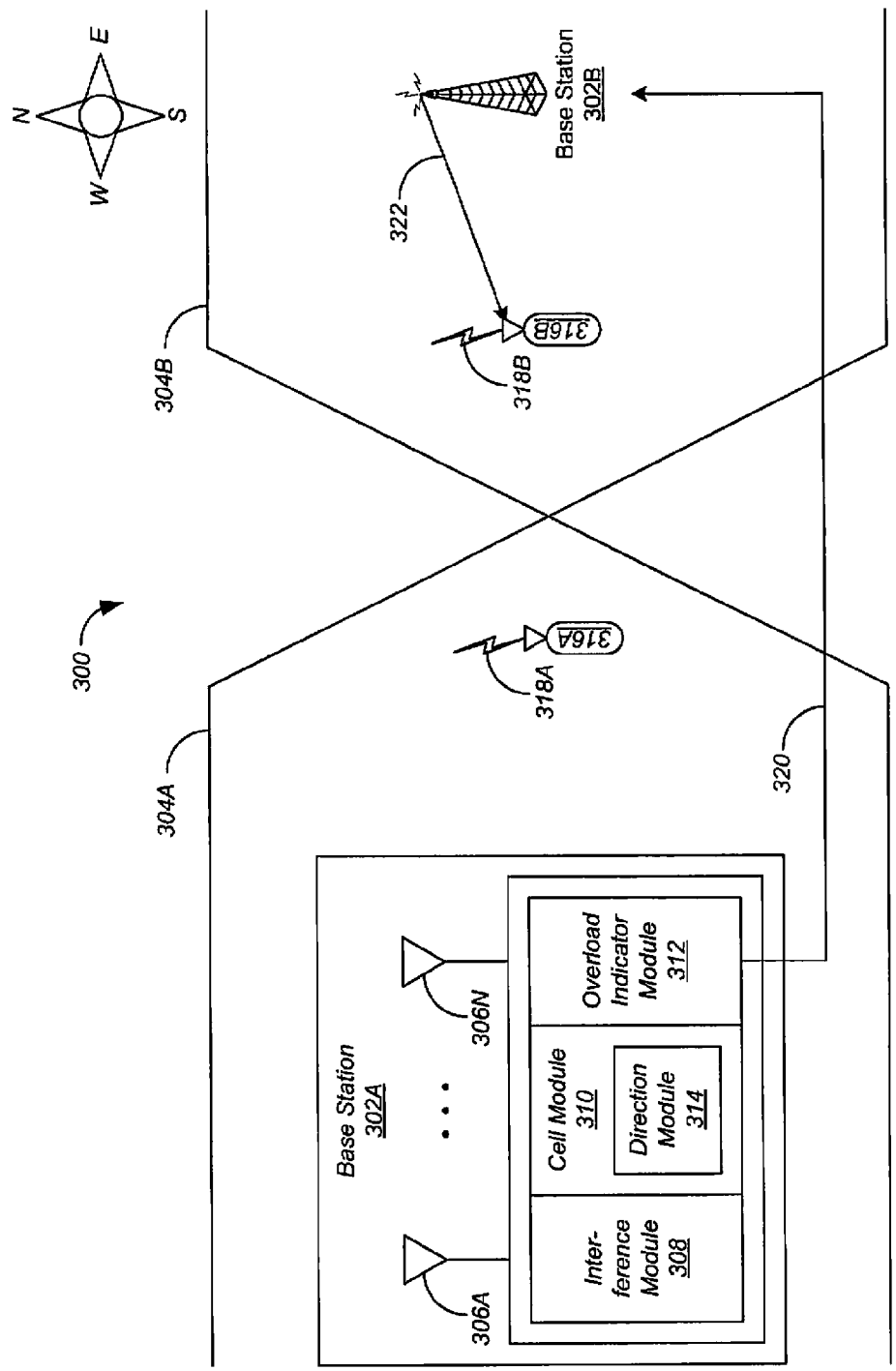
FIG. 3 shows a cellular telephone system featuring directional coordination for intercell interference according to one embodiment.

FIG. 3 shows a cellular telephone system 300 featuring directional coordination for intercell interference according to one embodiment. Referring to FIG. 3, cellular telephone system 300 includes a cellular telephone base station 302A serving a cell 304A and a neighboring cellular telephone base station 302B serving a neighboring cell 304B. Cellular telephone base station 302A is implemented according to an embodiment of the present invention, as described in detail below. Neighboring cellular telephone base station 302B can be implemented as a conventional cellular telephone base station or according to embodiments of the present invention. Embodiments of the present invention can operate with multiple neighboring cells. However, for clarity, only one neighboring cell 304B is shown.

Base station 302A includes a plurality of antennas 306A-N, an interference module 308, a cell module 310, and an overload indicator module 312. Cell module 310 includes a direction module 314. One or more cellular telephones 316A are located in cell 304A, and one or more cellular telephones 316B are located in neighboring cell 304B. For clarity, in this description cell 304A is referred to as the "local" cell, while cell 304B is referred to as a "neighboring" cell.

Although in the described embodiments, the elements of base station 302A are presented in one arrangement, other embodiments may feature other arrangements. For example, the elements of base station 302A can be implemented in hardware, software, or combinations thereof.

Figure 4:
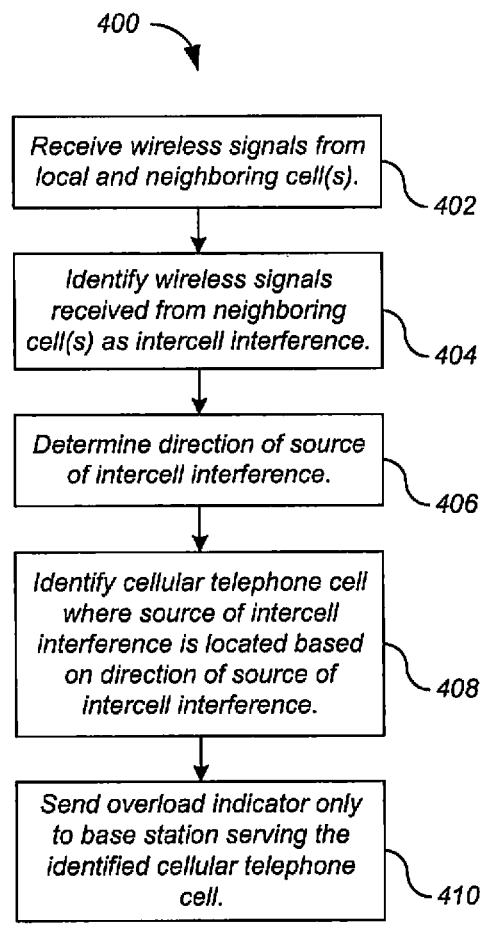
FIG. 4 shows an intercell interference mitigation process for the local base station of FIG. 3 according to one embodiment.

FIG. 4 shows an intercell interference mitigation process 400 for local base station 302A of FIG. 3 according to one embodiment. Although in the described embodiments, the elements of process 400 are presented in one arrangement, other embodiments may feature other arrangements. For example, in various embodiments, some or all of the steps of process 400 can be executed in a different order, concurrently, and the like. In addition, embodiments of the present invention can mitigate intercell interference from multiple neighboring cells. However, for clarity, only one neighboring cell 304B is described.

Referring to FIGS. 3 and 4, antennas 306 receive wireless cellular telephone signals 318, including not only local wireless cellular telephone signals 318A from cellular telephones 316A located in local cell 304A, but also wireless cellular telephone signals 318B from cellular telephones 316B located in neighboring cell 304B (step 402). Wireless cellular telephone signals 318B present intercell interference to base station 302A. Wireless cellular telephone signals 318 can comply with the IEEE 802.16 standards; the 3GPP standards, the 3GPP2 standards, and the like.

Interference module 308 identifies wireless cellular telephone signals 318B received from cellular telephones 316B located in neighboring cell 304B as intercell interference (step 404). That is, interference module 308 distinguishes wireless cellular telephone signals 318B from wireless cellular telephone signals 318A. For example, interference module 308 can identify intercell interference as the wireless cellular telephone signals 318 received by antennas 306 when no cellular telephones 316A located in local cell 304A are transmitting. As another example, interference module 308 can identify intercell interference as the difference between all of the wireless cellular telephone signals 318 received by antennas 306 and the wireless received from cellular telephones 316A located in local cell 304A. Local base station 302A can identify cellular telephones 316A located in local cell 304A by the reference sequences transmitted by cellular telephones 316A. Other techniques can be used.

Direction module 314 determines the direction of the source of the intercell interference (step 406). In the example of FIG. 3, direction module 314 determines the direction of the wireless cellular telephone signals 318B identified by interference module 308 as intercell interference. For example, direction module 314 determines the direction of the source of wireless cellular telephone signals 318B based on the geometry of antennas 306 and the relative phase delays of the wireless cellular telephone signals 318 received by antennas 306. In the example of FIG. 3, the direction is east. Of course, other techniques can be used.

Cell module 310 identifies the cellular telephone cell 304 where the source of the intercell interference is located based on the direction of the source of the intercell interference (step 408). For example, cell module 310 identifies the cellular telephone cell based on the direction of wireless cellular telephone signals 318 determined by direction module 314. In the example of FIG. 3, the direction is east, and the cell to the east of local cell 304A is cell 304B.

In one embodiment, overload indicator module 312 sends an overload indicator 320 only to the base station(s) serving the cellular telephone cell(s) 304 identified by cell module 310 (step 410). In the example of FIG. 3, overload indicator module 312 sends overload indicator 320 to base station 302B. Overload indicator 320 can be a conventional overload indicator, and can be sent in a conventional manner. In contrast to conventional approaches, overload indicator 320 is sent only to the neighboring base station(s) 302 serving cells 304 that are the source of intercell interference for local base station 302A. In one embodiment, overload indicator module 312 sends overload indicator 320 also to one or more base stations in cells that are adjacent to identified cell(s). In such an embodiment, a reduction in intercell interference can be maintained in situations where a cellular telephone is at the edge of an identified cell and the cellular telephone transitions to an adjacent cell. In one embodiment, an overload indicator 320 can be sent to an adjacent cell (e.g., a cell to which a cellular telephone moves into) if the cellular telephone in question still generates serious interference in this adjacent cell. The information on which adjacent cell a cellular telephone moves to can be obtained, for example, through a handover message.

Each base station 302 that receives an overload indicator 320 sends an instruction 322 to the cellular telephones 316 within the cell 304 served by that base station 302. In response to instruction 322, cellular telephones 316 reduce their transmit power, thereby reducing intercell interference for the originator of overload indicator 320. In the example of FIG. 3, neighboring base station 302B sends instruction 322 to the cellular telephone(s) 316B located in neighboring cell 304B, thereby reducing the intercell interference received by local base station 302A.

Various embodiments can be implemented in digital electronic circuitry, or in computer hardware, firmware, software, or in combinations of them. Apparatus can be implemented in a computer program product tangibly embodied in a machine-readable storage device for execution by a programmable processor; and method steps can be performed by a programmable processor executing a program of instructions to perform functions by operating on input data and generating output. Embodiments can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, it will be understood that various modifications may be made without departing from the scope of the disclosure. Accordingly, other implementations are within the scope of the following claims.

What is claimed is:

1. A base station located in a first cellular telephone cell, wherein the first cellular telephone cell is surrounded by a plurality of second cellular telephone cells neighboring the first cellular telephone cell, the base station comprising:
   a plurality of antennas;
   an analog front end in communication with the plurality of antennas;
   an interference module configured to identify wireless cellular telephone signals respectively received by the plurality of antennas from one or more cellular telephones located outside of the first cellular telephone cell, wherein the wireless cellular telephone signals are respectively transmitted by the one or more cellular telephones in accordance with a transmit power;
   a direction module configured to respectively determine a direction of each of the wireless cellular telephone signals respectively received by the plurality of antennas from the one or more cellular telephones located outside of the first cellular telephone cell; and
   a cell module configured to identify, based on the direction respectively determined for each of the wireless cellular telephone signals, one or more of the plurality of second cellular telephone cells from which the wireless cellular telephone signals were received by the plurality of antennas; and
   an overload indicator module configured to, in response to the analog front end becoming overloaded, respectively send an overload indicator only to those base stations serving the one or more of the plurality of second cellular telephone cells identified by the cell module, wherein the overload indicator instructs the base stations to respectively reduce the transmit power of the one or more cellular telephones.

2. The base station of claim 1, wherein
the direction module is configured to determine the directions of the wireless cellular telephone signals received by the plurality of antennas from the one or more cellular telephones located outside of the first cellular telephone cell based on a geometry of the plurality of antennas and relative phase delays of the wireless cellular telephone signals received by the plurality of antennas from the one or more cellular telephones located outside of the first cellular telephone cell.

3. The base station of claim 1:
wherein the interference module is configured to identify the wireless cellular telephone signals received by the plurality of antennas from the one or more cellular telephones located outside of the first cellular telephone cell based on wireless cellular telephone signals received by the plurality of antennas when no cellular telephones located in the first cellular telephone cell are transmitting.

4. The base station of claim 1, wherein the wireless cellular telephone signals received by the plurality of antennas from the one or more cellular telephones located outside of the first cellular telephone cell comply with one or more of:
   the IEEE 802.16 standards;
   the 3GPP standards; and
   the 3GPP2 standards.

5. A method of operating a base station located in a first cellular telephone cell, wherein the first cellular telephone cell is surrounded by a plurality of second cellular telephone cells neighboring the first cellular telephone cell, the method comprising:
   identifying wireless cellular telephone signals received by a plurality of antennas located in a first cellular telephone cell from one or more cellular telephones located outside of the first cellular telephone cell, wherein the wireless cellular telephone signals are respectively transmitted by the one or more cellular telephones in accordance with a transmit power;
   determining a direction of each of the wireless cellular telephone signals respectively received by the plurality of antennas from the one or more cellular telephones located outside of the first cellular telephone cell;
   identifying, based on the direction respectively determined for each of the wireless cellular telephone signals, one or more of the plurality of second cellular telephone cells from which the wireless cellular telephone signals were received by the plurality of antennas from the one or more cellular telephones; and in response to the an analog front end of the base station becoming overloaded, respectively sending an overload indicator only to those base stations serving the one or more of the plurality of second cellular telephone cells identified, wherein the overload indicator instructs the base stations to respectively reduce the transmit power of the one or more cellular telephones.

6. The method of claim 5, wherein:

determining the direction of the wireless cellular telephone signals received by the plurality of antennas from the one or more cellular telephones located outside of the first cellular telephone cell includes determining the direction based on a geometry of the plurality of antennas and relative phase delays of the wireless cellular telephone signals received by the plurality of antennas from the one or more cellular telephones located outside of the first cellular telephone cell.

7. The method of claim 5:

wherein the wireless cellular telephone signals received by the plurality of antennas from the one or more cellular telephones located outside of the first cellular telephone cell are identified based on wireless cellular telephone signals received by the plurality of antennas when no cellular telephones located in the first cellular telephone cell are transmitting.

8. The method of claim 5, wherein the wireless cellular telephone signals received by the plurality of antennas from the one or more cellular telephones located outside of the first cellular telephone cell comply with one or more of:

the IEEE 802.16 standards;
the 3GPP standards; and
the 3GPP2 standards.

9. A computer program stored on non-transitory computer readable medium and executable by a processor, for operating a base station located in a first cellular telephone cell, wherein the first cellular telephone cell is surrounded by a plurality of second cellular telephone cells neighboring the first cellular telephone cell, the computer program comprising:

instructions for identifying wireless cellular telephone signals received by a plurality of antennas located in a first cellular telephone cell from one or more cellular telephones located outside of the first cellular telephone cell, wherein the wireless cellular telephone signals are respectively transmitted by the one or more cellular telephones in accordance with a transmit power;

instructions for determining a direction of each of the wireless cellular telephone signals respectively received by the plurality of antennas from the one or more cellular telephones located outside of the first cellular telephone cell;

instructions for identifying, based on the direction respectively determined for each of the wireless cellular telephone signals, one or more of the plurality of second cellular telephone cells from which the wireless cellular telephone signals were received by the plurality of antennas from the one or more cellular telephones; and instructions for, in response to the an analog front end of the base station becoming overloaded, respectively sending an overload indicator only to those base stations serving the one or more of the plurality of second cellular telephone cells identified, wherein the overload indicator instructs the base stations to respectively reduce the transmit power of the one or more cellular telephones.

10. The computer program of claim 9, wherein:

instructions for determining the direction of the wireless cellular telephone signals received by the plurality of antennas from the one or more cellular telephones located outside of the first cellular telephone cell includes determining the direction based on a geometry of the plurality of antennas and relative phase delays of the wireless cellular telephone signals received by the plurality of antennas from the one or more cellular telephones located outside of the first cellular telephone cell.

11. The computer program of claim 9:

wherein the wireless cellular telephone signals received by the plurality of antennas from the one or more cellular telephones located outside of the first cellular telephone cell are identified based on wireless cellular telephone signals received by the plurality of antennas when no cellular telephones located in the first cellular telephone cell are transmitting.

12. The computer program of claim 9, wherein the wireless cellular telephone signals received by the plurality of antennas from the one or more cellular telephones located outside of the first cellular telephone cell comply with one or more of:

the IEEE 802.16 standards;
the 3GPP standards; and
the 3GPP2 standards.

* * * * *